(12) United States Patent
Chiappo

(10) Patent No.: US 7,468,102 B1
(45) Date of Patent: Dec. 23, 2008

(54) LIGHT-WEIGHT COMPOSITION FOR MASONRY, MORTAR AND STUCCO

(76) Inventor: Jorge G. Chiappo, 2941 5th Ave. North, St. Petersburg, FL (US) 33713

( * ) Notice: Subject to any disclaimer, the term of this patent is extended or adjusted under 35 U.S.C. 154(b) by 92 days.

(21) Appl. No.: 11/779,435

(22) Filed: Jul. 18, 2007

(51) Int. Cl.
*C04B 24/04* (2006.01)
*C04B 24/00* (2006.01)
*C04B 24/08* (2006.01)
*C04B 22/00* (2006.01)

(52) U.S. Cl. ............... 106/716; 106/677; 106/691; 106/696; 106/708; 106/801

(58) Field of Classification Search ........... 106/677, 106/691, 696, 708, 716, 801
See application file for complete search history.

(56) References Cited

U.S. PATENT DOCUMENTS

| | | | |
|---|---|---|---|
| 2,890,752 A | * | 6/1959 | Crone et al. ............ 166/293 |
| 5,718,758 A | | 2/1998 | Breslauer |
| 6,537,366 B1 | * | 3/2003 | Supplee, Sr. ............ 106/712 |
| 6,840,996 B2 | | 1/2005 | Morioka et al. |
| 7,070,647 B2 | | 7/2006 | Fujimori et al. |
| 7,148,270 B2 | | 12/2006 | Bowe |

FOREIGN PATENT DOCUMENTS

JP    5-60055 A  *  5/1980

* cited by examiner

*Primary Examiner*—Anthony J Green
(74) *Attorney, Agent, or Firm*—Larson & Larson; Frank Liebenow

(57) ABSTRACT

An application for a cement composition includes a cement (either Portland cement or hydraulic cement), hydrous magnesium silicate, sodium tall oil, sodium stearate, sodium C14-16 Alpha Olefin, linear alkyl benzene; and silicon dioxide.

14 Claims, No Drawings

100,102 B1

LIGHT-WEIGHT COMPOSITION FOR MASONRY, MORTAR AND STUCCO

FIELD OF THE INVENTION

This invention relates to the field of cement and more particularly to a light-weigh composition of cement for use with masonry or as mortar or as stucco.

BACKGROUND OF THE INVENTION

Mortar and stucco normally consists of the combination of cement and sand in a ratio of approximately three (3) parts sand to one (1) part cement. Directions for specific brands of cement usually call for from 2.25:1 to 3:1 sand to cement ratios. The cement is generally mixed at the job-site in a gasoline or electric powered mortar mixers. Often, the sand is delivered in bulk, while the cement mix is delivered in bags weighing either 78 or 80 pounds. Due to the weight of the bags, they are often delivered on palates and lifted with fork lifts and/or cranes. One bag of cement mix is mixed with approximately three cubic feet of sand. Water is added to achieve a consistency that allows good workability. While the term sand is used throughout this disclosure for ease of discussion, those skilled in the art will recognize that sand may include other heavy aggregates, such as gravel, crushed stone and the like.

The weight and volume of these bags of cement create several problems. During storage, the weight and volume relate to the total storage space required and the cost of transporting within the warehouse. During transportation, the volume and weight affect the total number of bags that fit within a given truck and the fuel consumption required to transport the bags to the construction site. At the construction site, the weight becomes more of an issue since individual bags are often lifted by a worker and many bags are lifted per day, the 78-80 pound bags cause fatigue and are the cause of many stress-related ailments.

U.S. Pat. No. 5,718,758 to Breslauer recognizes that mortars of the prior art create problems due to weight, leading to worker injury during carrying of the mortar, etc.

Other cement compositions disclosed in U.S. Pat. No. 6,840,996 to Morioka, et al, U.S. Pat. No. 7,070,647 to Fujimori, et al, and U.S. Pat. No. 7,148,270 to Bowe describe various cement compositions, none of which provide a light-weight ready-mix composition.

What is needed is a light-weight, cement mix for mixing with sand for masonry, mortar and stucco.

SUMMARY OF THE INVENTION

In one embodiment, a cement composition is disclosed including a cement (either Portland cement or hydraulic cement), hydrous magnesium silicate, sodium tall oil, sodium stearate, sodium C14-16 Alpha Olefin, linear alkyl benzene; and silicon dioxide.

In another embodiment, a cement composition is disclosed including from 35 to 90 percent hydraulic cement by weight, from 2 to 10 percent hydrous magnesium silicate by weight, from 1 to 3 percent sodium tall oil by weight, from 1 to 2 percent sodium stearate by weight, from 1 to 2 percent sodium C14-16 Alpha Olefin by weight, from 1 to 3 percent linear alkyl benzene by weight and from 10 to 20 percent silicon dioxide by weight.

In another embodiment, a cement composition is disclosed including from 35 to 90 percent Portland cement by weight, from 2 to 10 percent hydrous magnesium silicate by weight, from 1 to 3 percent sodium tall oil by weight, from 1 to 2 percent sodium stearate by weight, from 1 to 2 percent sodium C14-16 Alpha Olefin by weight, from 1 to 3 percent linear alkyl benzene by weight and from 10 to 20 percent silicon dioxide by weight.

BRIEF DESCRIPTION OF THE DRAWINGS

The invention can be best understood by those having ordinary skill in the art by reference to the following detailed description.

DETAILED DESCRIPTION OF THE INVENTION

Reference will now be made in detail to the presently preferred embodiments of the invention. Although the disclosed cement mixture is ideal for use in masonry, mortar and stucco, there is no limitation to the application of the cement mix of the present invention.

Prior to the present invention, cement mix is delivered to the job site in bags weighing 78 or 80 pounds. The weight of these bags often causes stress and strain injuries to the workers. Additionally, transporting and storage of these bags utilizes more space and energy than is needed. The cement of the present invention provides the same resulting volume of cement with the strength and consistency of the prior art cements at a per-bag weight of approximately 65 pounds, saving energy and storage space and reducing worker stress and strain.

The cement mix of the present invention is mixed with the same amount of aggregate (e.g., sand) as the prior cement mixes which is approximately three cubic yards. After mixing the cement mix of the present invention with sand and water, the resulting volume is similar to that of the prior art.

The cement mix of the present invention consists of from 35% to 90% cement by weight (either Portland cement or hydraulic cement), from 2% to 10% hydrous magnesium silicate by weight, from 1% to 3% sodium tall oil (e.g., a wood pulp by-product) by weight, from 1% to 2% sodium stearate by weight, from 1% to 2% sodium $C_{14-16}$ Alpha Olefin by weight, from 1% to 3% linear alkyl benzene by weight and from 10% to 20% silicon dioxide $SiO_2$ (also known as silica or silox) or fly ash by weight. Silicon dioxide $SiO_2$ is often derived from fly ash which is a byproduct of coal combustion. Fly ash also consists of aluminum oxide ($Al_2O_3$) and iron oxide ($Fe_2O_3$).

When a 65 pound bag of cement mix of the present invention is mixed with aggregate and water, it produces a similar amount of mix as a 78 or 80 pound bag of cement of the prior art. Therefore, less weight is transported to the job site, yet the same amount of resulting mix is derived.

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A cement composition comprising:
   a cement selected from the group consisting of Portland cement and hydraulic cement;
   hydrous magnesium silicate;
   sodium tall oil;
   sodium stearate;
   sodium $C_{14-16}$ Alpha Olefin;
   linear alkyl benzene; and
   silicon dioxide.

2. The cement composition of claim 1, wherein the cement comprises from 35 to 90 percent Portland cement by weight.

3. The cement composition of claim 1, wherein the cement comprises from 35 to 90 percent hydraulic cement by weight.

4. The cement composition of claim 1, wherein the cement composition comprises from 2 to 10 percent hydrous magnesium silicate by weight.

5. The cement composition of claim 1, wherein the cement composition comprises from 1 to 3 percent sodium tall oil by weight.

6. The cement composition of claim 1, wherein the cement composition comprises from 1 to 2 percent sodium stearate by weight.

7. The cement composition of claim 1, wherein the cement composition comprises from 1 to 2 percent sodium $C_{14-16}$ Alpha Olefin by weight.

8. The cement composition of claim 1, wherein the cement composition comprises from 1 to 3 percent linear alkyl benzene by weight.

9. The cement composition of claim 1, wherein the cement composition comprises from 10 to 20 percent silicon dioxide by weight.

10. The cement composition of claim 1, wherein the cement composition is provided in 65 pound bags.

11. A cement composition comprising:
    35 to 90 percent hydraulic cement by weight;
    2 to 10 percent hydrous magnesium silicate by weight;
    1 to 3 percent sodium tall oil by weight;
    1 to 2 percent sodium stearate by weight;
    1 to 2 percent sodium $C_{14-16}$ Alpha Olefin by weight;
    1 to 3 percent linear alkyl benzene by weight; and
    10 to 20 percent silicon dioxide by weight.

12. The cement composition of claim 11, wherein the cement composition is provided in 65 pound bags.

13. A cement composition comprising:
    35 to 90 percent Portland cement by weight;
    2 to 10 percent hydrous magnesium silicate by weight;
    1 to 3 percent sodium tall oil by weight;
    1 to 2 percent sodium stearate by weight;
    1 to 2 percent sodium $C_{14-16}$ Alpha Olefin by weight;
    1 to 3 percent linear alkyl benzene by weight; and
    10 to 20 percent silicon dioxide by weight.

14. The cement composition of claim 13, wherein the cement composition is provided in 65 pound bags.

* * * * *